(12) United States Patent
Bejerano et al.

(10) Patent No.: US 7,477,610 B2
(45) Date of Patent: Jan. 13, 2009

(54) METHODS AND DEVICES FOR COORDINATING THE TRANSMISSIONS OF ACCESS POINTS IN WLANS

(75) Inventors: Yigal Bejerano, Springfield, NJ (US); Randeep S. Bhatia, Green Brook, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 884 days.

(21) Appl. No.: 10/788,458

(22) Filed: Mar. 1, 2004

(65) Prior Publication Data

US 2005/0190701 A1 Sep. 1, 2005

(51) Int. Cl.
*G01R 31/08* (2006.01)
(52) U.S. Cl. .................................. 370/252; 370/458
(58) Field of Classification Search ................ 370/310, 370/338, 447, 348, 395.21; 455/450.2, 524
See application file for complete search history.

(56) References Cited

U.S. PATENT DOCUMENTS

2002/0154653 A1* 10/2002 Benveniste ................ 370/447
2003/0169697 A1* 9/2003 Suzuki et al. ............. 370/310
2005/0169222 A1* 8/2005 Ayyagari et al. ........... 370/338

OTHER PUBLICATIONS

P.S. Henry, and Luo Hui. Wifi: What's next? *IEEE Communications Magazine*, 40(12):66-72, Dec. 2002.

Thyagarajan Nandagopal, Tae-Eun Kim, Xia Gao and Vaduvur Bharghavan. Achieving MAC Layer Fairness In Wireless Packet Networks. In *Proceedings of the sixth annual international conference on Mobile computing and networking*, pp. 87-98. ACM Press, 2000.
A. Kopsel and A. Wolisz. Voice transmission in an IEEE 802.11 WLAN based access network. In *Proceedings of WoWMoM 2001*, vol. 1, pp. 24-33, Rome, Italy, Jul. 2001.
Constantine Coutras, Sanjay Gupta and Ness B. Shroff. Scheduling of real-time traffic in IEEE 802.11 wireless LANs. *Wireless Networks*, 6(6):457-466, 2000.
M. Veeraraghavan, N. Cocker and T. Moors. Support of voice services in IEEE 802.11 wireless LANs. In *Proceedings of IEEE INFOCOM'01*, vol. 1, pp. 488-497, Anchorage, Alaska, Apr. 2001.
S. Mangold. Coexistence of Overlapping Basic Service Sets. In *Proceedings of the Mobile Venue'02*, Athens, Greece, May 2002.
S. Mangold, L. Berlemann and G. Hiertz. QoS Support as Utility for Coexisting Wireless LANs. In *Proceedings of the International Workshop on IP Based Cellular Networks*, IPCN, Paris, France, May 2002.
Qiang Ni, Lamia Romdhani, Thierry Turletti and Imad AAd. QoS Issues and Enhancements for IEEE 802.11 Wireless LAN. *Technical Report RR-461*, Inria, France, Nov. 2002.

(Continued)

*Primary Examiner*—Chirag G Shah
*Assistant Examiner*—Yong Zhou

(57) ABSTRACT

The coordination of transmissions by access points (APs) in a wireless local area network (WLAN) is carried out by allowing APs to transmit during slots of a Contention Free Period (CFP). Prior to transmission, slots are assigned to APs using a 4-approximation technique. This technique allows an AP to transmit using multiple frequencies. The assignment of slots satisfies a maximal, lower bound of an AP slot-to-user ratio.

14 Claims, 2 Drawing Sheets

OTHER PUBLICATIONS

S. Mangold, S. Choi, P. May, O. Klein, G. Hiertz and L. Stibor. IEEE 802.11e Wireless LAN for Quality of Service. In *Proceedings of the European Wireless*, vol. 1, pp. 32-39, Florence, Italy, Feb. 2002.

Madhav V. Marathe, Heinz Breua, Harry B. Hunt III, S. S. Ravi and Daniel J. Rosenkrantz. Simple Heuristics for Unit Disk Graphs. *Networks*, 25:59-68, 1995.

Dan Chalmers and Morris Sloman. A Survey of Quality of Service in Mobile Computing Environments. *IEEE Communications Surveys*, 2(2), 1999.

Nitin H. Vaidya, Paramvir Bahl and Seema Gupta. Distributed Fair Scheduling in a Wireless LAN. In *Proceedings of the sixth annual international conference on Mobile computing and networking*, pp. 167-178, ACM Press, 2000.

J. L. Sobrinho and A.S. Krishnakumar. Real-Time Traffic over the IEEE 802.11 Medium Access Control Layer. *Bell Labs Technical Journal*, pp. 172-187, Autumn 1996.

Koksal et al, "An analysis of short-term fairness in wireless media access protocols" (poster), Measurement and Modeling of Computer Systems, 2000.

Ozugur et al, "Balanced media access methods for wireless networks", Proceedings of MobiCom '98, 1998.

Aad et al, "Differentiation mechanisms for IEEE 802.11", Proceedings of INFOCOM '01, 2001.

Qiao et al, "Achieving efficient channel utilization and weighted fairness for data communications in IEEE 802.11 WLAN under the DCF", Proceedings of IWQoS '02, 2002.

Veres et al, "Supporting service differentiation in wireless packet networks using distributed control", IEEE JSAC 19 (10), pp. 2081-2093, 2001.

Sheu et al, "Dbase: A distributed bandwidth allocation/sharing/extension protocol for multimedia over IEEE 802.11 ad hoc wireless LAN", Proceedings of INFOCOM '01, 2001.

Rappaport, Wireless communication Principle and Practice, Prentice Hall, 1996.

O'Hara et al, The IEEE 802.11 Handbook: A Designer's Companion, Standards Information Network, IEEE Press, 1999.

Hochbaum et al, "Approximation schemes for covering and packing problems in image processing and VLSI", Journal of the ACM 31, pp. 130-136, 1985.

Clark et al, "Unit disk graphs", Discrete Mathematics 86 (1-3), pp. 165-177, 1990.

Graf et al, "On coloring unit disk graphs", Algorithmica 20 (3), pp. 277-293, 1998.

Hills, "Large-scale wireless LAN design", IEEE Communications Magazine 39 (11), pp. 98-107, 2001.

\* cited by examiner

☐ FIRST COLOR
○ SECOND COLOR
△ THIRD COLOR

METHODS AND DEVICES FOR COORDINATING THE TRANSMISSIONS OF ACCESS POINTS IN WLANS

BACKGROUND OF THE INVENTION

Recently, research has been completed related to techniques which seek to provide "fairness" (i.e., a minimal allocated bandwidth) and quality of service ("QoS") guarantees for wireless local area networks (WLANs). For example, co-pending U.S. patent application Ser. No. 10/788,460 entitled "Methods and Devices for Providing a Relative Level of Fairness and QoS Guarantees to Wireless Local Area Networks" discloses techniques which divide a contention free period ("CFP") into a plurality of slots. Thereafter, only non-interfering access points are allowed to transmit during one or more slots which have been allocated or assigned to each access point ("AP"). By only allowing non-interfering access points to transmit during an assigned or allocated slot, problems (e.g., hidden node and overlapping cell problems) associated with providing fairness and QoS guarantees are eliminated.

Co-pending U.S. patent application Ser. No. 10/788,460 sets forth one criteria which may be used to determine the number of CFP slots to assign to an AP, that being, assigning slots to APs such that a lower bound of AP slot-to-user ratios is maximized. Based on this criteria, co-pending U.S. patent application Ser. No. 10/788,460 ensures that every AP has at least one slot during which it is allowed to transmit. That said, co-pending U.S. patent application Ser. No. 10/788,460 is not necessarily directed at determining how long an access point will be allowed to transmit during a CFP (i.e., how many transmission slots should be assigned to each access point) or when an access point will be allowed to transmit (i.e., during which slots, hereafter referred to sometimes as "slot sequence").

It is therefore desirable to provide methods and devices for determining the number of transmission slots to assign to each AP and the slot sequence for each AP based on a maximal, lower bound of AP slot-to-user ratios. Collectively, the assignment of slots, slot sequence (as well as other functions) may be referred to as coordinating AP transmissions in a WLAN during a CFP.

SUMMARY OF THE INVENTION

In accordance with the present invention, the number of slots and slot sequence to assign to each AP in a CFP is provided by a method that first estimates a number of slots for each AP associated with the CFP. These estimates, along with an interference graph associated with every AP, are used to generate estimated slot sequences, slot assignments and a transmission frequency for each AP. In order to determine whether these second estimates are practical, a total number of slots used in the second estimation process is compared to a total number of known, available slots. If the estimates are practical, the slot assignments are then checked to see if they meet an optimal assignment scheme. If an optimal assignment scheme is met, no further adjustments are necessary and the slot assignments, slot sequences and frequencies can be applied to each respective AP. If an assignment scheme is impractical or is not optimal, then the slot-to-user ratio of each access point is adjusted (e.g., increased or decreased) and the process is repeated until a practical and optimal assignment scheme is generated.

DETAILED DESCRIPTION OF THE INVENTION

Figure 1:
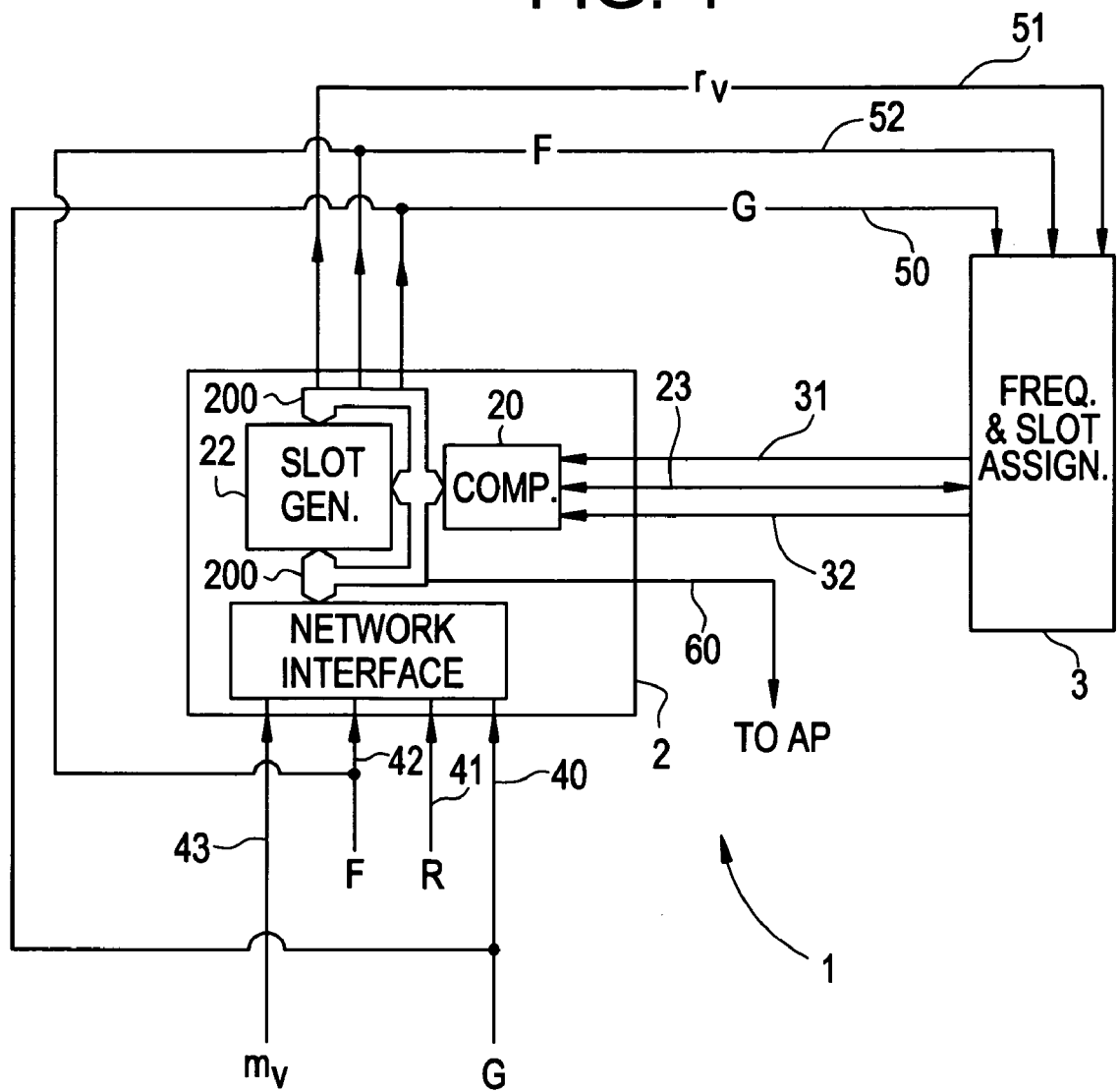
FIG. 1 depicts a simplified, functional block diagram of components of one embodiment of the present invention.

Referring now to FIG. 1, there is shown a simplified block diagram illustrating a slot assignment unit 1 which may be used to determine the number of slots of a CFP to assign to each AP and the slot sequence for each AP based on a maximal, lower bound of AP, slot-to-user ratios. The unit 1 comprises a slot assignment decision unit 2 and a potential, frequency and slot generator 3 (hereafter "generator").

In one embodiment of the present invention, an available number of slots, R, frequencies F, and a total number of users, $m_v$, for each access point, v, may be input into decision unit 2. In addition to these inputs, an interference graph, G (i.e., data making up such a graph) may also be input into unit 2.

Upon receiving these inputs, unit 2 is operable to estimate a slot-to-user ratio, $\rho$, where $$\rho = \frac{r_v}{m_v},$$

and where $r_v$ represents the number of slots assigned to each AP, $m_v$ the total number of users associated with each AP, and $\rho$ falls in the range defined by $\max_v \{m_v * \rho\} \leq R$ for each AP. It should be understood that the first estimates of slot-to-user ratios may simply be guesses.

After generating an estimate of $\rho$ for each AP, the unit 2 is operable to estimate the number of slots to assign to each AP, $r_v$ and then forward these values of $r_v$ on to the generator 3.

Generator 3 may also receive the frequencies, F, and interference graph, G. It is the task of the generator 3 to estimate an assignment scheme for all of the APs. That is to say, generator 3 is operable to receive the value $r_v$ for each AP and then attempts to assign each AP a number of slots in accordance with its $r_v$ value (hereinafter called "slot assignment") taking into consideration, however, the patterns dictated by interference graph, G. In addition to assigning a number of slots, the generator 3 is operable to assign specific slots, to each AP (i.e., the slot sequencing) within a CFP as well as selecting the frequency each AP will transmit at within the time period associated with its so-assigned slot. Generator 3 attempts to assign as few total slots as possible in order to minimize the total number of slots used while still making use of the slots/assignments $r_v$ sent to it from the decision unit 2 and in such a manner that no two interfering APs that are assigned the same frequency are assigned the same slot(s) (i.e., during a given slot only non-interfering APs transmit at a given frequency).

Thereafter, the generator 3 forwards these estimated frequencies, slot assignments, slot sequences and a total number of slots, T, required to carry out the slot assignments on to the decision unit 2 via pathways 31,32. The decision unit 2 is then operable to compare the total number of slots, T, to the available number of slots, R. That is to say, the decision unit 2 must determine whether the generator 3 has assigned a number of slots which exceeds the number of available slots in a given CFP. If this comparison results in a determination that the number of assigned slots generated by the generator 3 is less than the number of available slots, then decision unit 2 stores the frequencies, slot assignments and slot sequences generated in the generator 3 because the frequencies, slot assignments and slot sequences may, in all practicality, be used.

In addition, decision unit 2 may be operable to adjust the estimated slot-to-user ratios, ρ of each AP. That is, because the potential number of total slots assigned by generator 3 is less than a total number of available slots, R, the slot assignments generated by generator 3 may not be optimal. To optimize the slot assignments, the slot-to-user ratios ρ may be adjusted. In one embodiment of the present invention, the decision unit 2 may generate larger, estimated values for each AP's slot-to-user ratio ρ.

After generating new estimates for the slot-to-user ratios, decision unit 2 is further operable to generate new slot assignment values for $r_v$ and to forward these new, estimated values for $r_v$ on to the generator 3. In response, generator 3 is operable to generate a next set of possible frequency, slot assignments and slot sequences, again using as few slots as possible.

Backtracking, if, however, the number of total slots assigned by generator 3 exceeds the number of available, possible slots, R, then the decision unit 2 does not store the frequency, slot assignments and slot sequences because they are impractical. Instead, in a further embodiment of the present invention, the decision unit 2 again adjusts the slot-to-user ratios ρ. More specifically, the decision unit 2 decreases the slot-to-user ratio of each AP. Thereafter, the decision unit 2 generates new values for $r_v$ and forwards these values on to generator 3. As before, upon receiving these new values, generator 3 is operable to generate frequency, slot assignments and slot sequences for each AP.

The process described above continues until the slot-to-user ratio measured by the decision unit 2 upon receiving a particular frequency and slot assignment scheme, reaches a maximal, lower bound for all APs. This ratio represents a slot assignment scheme which results in a fair assignment of slots to each AP based on the relative number of users associated with each AP. When this point is reached, the decision unit 2 stores the frequencies, slot assignments and slot sequences generated by the generator 3 and applies these to each AP.

It should be understood that the maximal, slot-to-user ratio is designed to ensure that each AP is assigned a fair number of slots in proportion to its associated number of users. That is, the greater the number of users associated with each AP, the greater the number of slots which should be assigned or allocated to that AP and vice-versa (the lower the number of users associated with each AP, the lower the number of slots that should be assigned to each AP).

Unit 1 shown in FIG. 1 is operable to determine the number of slots to assign to each AP in order to achieve this "fairness." Again, this fairness may be achieved when a slot-to-user ratio measured by decision unit 2 equals a maximal lower bound.

From FIG. 1, it can be seen that the decision unit 2 may be made up of a number of units including a network interface 21, slot generation unit 22 and a control unit 20. As indicated before, the decision unit 2 receives a number of inputs which may be initially input, for example, into the network interface 21 or the like. Upon receiving these inputs, the network interface 21 may be operable to forward one or more of these inputs to the slot generation unit 22. In one embodiment of the present invention, the slot generation unit 22 may be operable to generate the initial and subsequent estimates of the slot-to-user ratios ρ and slot assignments $r_v$.

The other component shown within the decision unit 2 is the control unit 20. The control unit 20 may be operable to receive the frequencies, slot assignments and slot sequences from the generator 3 and then carry out the comparisons discussed above and below.

Before going further, it should be noted that though the decision unit 2 is shown comprising three components and the generator 3 is shown comprising a single component, this is just for illustrative purposes only. The decision unit 2 and generator 3 may comprise more or less components than shown and still operate according to the spirit of the present invention provided the number of components carry out the features and functions of the present invention. In addition, it should be noted that the components of the decision unit 2 and the generator 3 may be implemented in software, hardware, firmware or some combination of the three. Finally, it should also be noted that though the decision unit 2 is shown separate from the generator 3, in fact the two can be combined into one unit or further broken down into additional units provided, again, these units (or unit) carry out the features and functions of the present invention.

Having presented an overview of the present invention, the following presents a more detailed explanation of the features and functions of the present invention. Throughout the discussion which follows, the terms "3-approximation technique" and "4-approximation technique" will be used. It should be understood that a 3-approximation technique involves a technique where each AP uses a single frequency. In contrast, a 4-approximation technique allows for the use of multiple frequencies. That is, an AP is allowed to transmit data on one of a plurality of frequencies instead of just on a single frequency.

In one embodiment of the present invention, $G=(V, E)$ is an interference graph, such as the one defined in co-pending U.S. patent application Ser. No. 10/788,460 the disclosure of which is incorporated herein by reference, where G is a unit disk graph. Initially, a so-called "coloring problem" can be formulated for G. Hereafter, the word "color" and slot may be used interchangeably. Those of ordinary skill in the art will recognize the two terms as being synonymous. The present invention assumes that each node (i.e., AP) $v \in V$ is associated with an integer requirement $r_v \geq 1$, which is the number of distinct colors required by node v. A coloring problem for G may be formulated as an assignment of a number of $r_v$ distinct colors $S_v$ to every node $v \in V$, such that no common color is assigned to the two end nodes of any edge $(u, v) \in E$, i.e., $S_u \cap S_v = \emptyset$ and the total number of colors used $|\cup_{v \in V} S_v|$ is minimized. Thereafter, a joint coloring and frequency assignment problem may be formulated for G. In addition to identifying a coloring scheme for a group of nodes of G, frequencies from a given set F also need to be assigned to the group of nodes of G. Each node v is assigned a single frequency $f_v \in F$ and $S_u \cap S_v = \emptyset$ for only those edges $(u, v) \in E$, such that $f_u = f_v$, in order to minimize the total number of colors used, $|\cup_{v \in V} S_v|$.

Existing techniques have demonstrated that deciding whether or not a unit disk graph with unit requirements (i.e., a situation where all APs require exactly one slot) can be colored with 3 colors is NP-complete. This implies that both the joint coloring and frequency assignment formulations discussed above cannot be approximated to a ratio of 4/3 or better unless P=NP. It has also been shown that deciding whether or not a unit disk graph with unit requirements can be colored with k colors is also NP-complete for all $k \geq 3$. It should be noted that this implies that a more general coloring and frequency assignment problem is also NP-complete for $k \geq 3$.

In one embodiment of the present invention, the shortcomings of existing 3-approximation techniques are overcome by a 4-approximation technique of the present invention that jointly colors and assigns frequencies following the steps outlined earlier and as described further herein. It should be noted that when just a single frequency is involved (i.e., 3-approximation technique), the coloring and assignment schemes are substantially the same as a coloring scheme only.

To explain the 4-approximation technique, we begin first with some definitions and assumptions. For a unit disk coloring problem with general requirements, where a set of neighbors of node v in a graph G is denoted by n(v), it is assumed that the colors are numbered 1,2,3, . . . etc. and the location of the associated APs (i.e., the center of the unit disks) are known. The above-mentioned assumptions help simplify the explanation which follows.

Before going further, however, it should be further noted that the results generated by the present invention also extend to the case where the locations of the APs may be unknown.

Continuing, let $v_1, v_2 \ldots v_n$ be the nodes of G ordered by the non-decreasing X-coordinate of their locations. The 4-approximation technique provided by the present invention may process node vertices in a reverse order $v_n, v_{n-1} \ldots v_1$ and apply a generalized first-fit in order to assign frequencies/colors. Let $N(v_i) \subseteq n(v_i)$ be the set of neighbors of node $v_i$ among the nodes $v_{i+1}, v_{i+2} \ldots v_n$. Thus, $N(v_n) = \emptyset$.

In a further embodiment of the present invention, the 4-approximation technique may also take vi into consideration. When this is done, all of the nodes in $N(v_i)$ have already been assigned colors and frequencies. Let $N_f(v_i) \subseteq N(v_i)$ be the set of neighbors of node $v_i$ in $N(v_i)$ that have been assigned frequency $f \in F$ by the 4-approximation technique. When this occurs, the sets $N_f(v)$, $f \in F$ form a partition of $N(v)$ for all v in G.

In yet another embodiment of the present invention, the 4-approximation technique determines frequency assignments for node $v_i$, by applying a first-fit, for each possible frequency $f \in F$. In other words, assuming a frequency f, the present invention computes a least number $r_{vi}$ of colors that can be assigned to $v_i$, while considering only the nodes in $N_f(v_i)$. Then, the present invention selects that frequency f for which the largest number of colors assigned to $v_i$ by a first-fit step is minimized (ties are broken arbitrarily) and assigns, accordingly, a set of colors to node $v_i$.

Table 1 summarizes some of the steps of the 4-approximation technique just discussed.

TABLE 1

```
For i = n down to 1
    minMaxColor = ∞
    f = 0
    For j = 1 up to |F| /* Compute best freq. f for v_i*/
        C = r_vi -th largest avail. color for v_i for freq. f_j
        If minMaxColor > C then
            minMaxColor = C
            f = f_j
        End If
    End For
    Assign r_vi minimum avail. colors for freq. f to v_i
    Assign freq. f to v_i
End For
```

Figure 2:
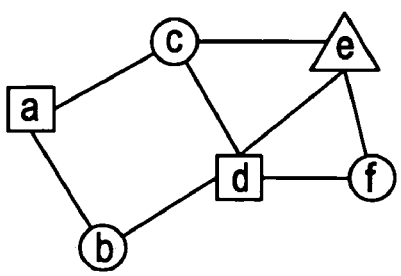
FIG. 2 depicts a simplified, interference graph according to one embodiment of the present invention.

In another embodiment of the present invention, an interference graph G, like that shown in FIG. 2, comprises a plurality of nodes a-f that may be ordered by the non-decreasing X-coordinate of their locations, yielding a sequence a,b,c,d,e,f. Let F consist of two frequencies $f_1$ and $f_2$. A 4-approximation technique provided by the present invention may first assign color 1 and frequency $f_1$ to node f. For the next node (node e), the smallest available color for frequency $f_1$ is 2 and for frequency $f_2$ is 1. Hence, the 4-approximation technique provided by the present invention may assign color 1 and frequency $f_2$ to node e. It should be noted that at this point, the set of available colors for node d includes all colors except color 1 for both frequencies $f_1$ and $f_2$. Continuing, colors 2 and 3 and frequency $f_1$ may be assigned to node d; colors 2 and 3 and frequency $f_2$ may be assigned to node c; color 1 and frequency $f_2$ may be assigned to node b; and colors 1 and 2 and frequency $f_1$ may be assigned to node a. Thus, the total number of colors used by the present invention given the interference graph G in FIG. 1 with two frequencies is 3, which is optimal.

The 4-approximation technique may also be used to formulate a unit disk coloring and frequency assignment problem.

Recalling that the present invention seeks to assign slots based on maximizing a lower bound of slot-to-user ratios, a corollary maximum, $\max_v r_v$, may be defined as a maximum of a lower bound on the total number of colors used by an ideal solution. This follows from the fact that the colors assigned to any node must all be distinct.

In yet a further embodiment of the present invention, the inventors discovered that the total number of colors used by the 4-approximation technique is at most $$K = \max_i \left\lceil \frac{\sum_{u \in N(vi)} r_u + r_{vii}}{|F|} \right\rceil + \max_v r_v. \quad (1)$$

The total number of colors, K, given by Equation (1) may be compared to an ideal color/slot assignment.

For the sake of argument, suppose Equation (1) did not represent the total number of colors. Suppose further that a violation first occurs when node $v_j$ is considered (e.g., $v_j$ is assigned a color greater than K). Given these circumstances, a maximum number of colors, for every frequency f, among a set of colors, is computed by applying a first-fit approximation to the set of colors assigned by the 4-approximation technique to nodes $N_f(v_j)$. This maximum must be strictly greater than $$\left\lceil \frac{\sum_{u \in N(vj)} r_u + r_{vj}}{|F|} \right\rceil + r_{vj}. \quad (2)$$

Thus, for every frequency f the number of distinct colors assigned by the 4-approximation technique to nodes in $N_f(v_j)$ is strictly greater than $$\left\lceil \frac{\sum_{u \in N(vj)} r_u}{|F|} \right\rceil, \text{ implying that}$$

$$\sum_{u \in N(vj)} r_u > \left\lceil \frac{\sum_{u \in N(vj)} r_u}{|F|} \right\rceil$$

for all f. But, this cannot happen because the sets $N_f(v_j)$, $f \in F$ form a partition of the set $N(v_j)$ and would thus imply that $$\sum_{u \in N(vj)} r_u = \sum_{f} \sum_{u \in N_f(vj)} r_u > |F| \left\lceil \frac{\sum_{u \in N(vj)} r_u}{|F|} \right\rceil \geq \sum_{u \in N(vj)} r_u. \quad (3)$$

In sum, the present inventors believe that Equation (1) does in fact represent a total number of colors that can be used by the 4-approximation technique of the present invention.

Though Equation (1) represents the total number of colors which may be used by the 4-approximation technique of the present invention, this number of colors may not represent the number of colors which may be used by an ideal coloring and frequency assignment technique.

In fact, the present inventors discovered that any coloring and frequency assignment technique must use a number of colors given by:

$$\max_i \left\lceil \frac{\sum_{u \in N(vi)} r_u + r_{vi}}{(3|F|)} \right\rceil \text{ colors} \quad (4)$$

One way to prove that Equation (4) represents the number of colors used by an optimal coloring and frequency assignment technique of the present invention is as follows. Suppose $v_1, v_2 \ldots v_n$ are nodes of G ordered by the non-decreasing X-coordinates of their locations. As such, node $v_i$ can be shown to have the minimum X-coordinate among all nodes in $\{v_i\} \cup N(v_i)$. It has been shown previously that the set of nodes $\{v_i\} \cup N(v_i)$ do not contain an independent set of size more than 3 in G. Thus, the nodes $\{v_i\} \cup N(v_i)$ require at least $$\left\lceil \frac{\left(\sum_{u \in N(vi)} r_u + r_{vi}\right)}{(3|F|)} \right\rceil$$

distinct colors in any feasible coloring of G. This is because the nodes assigned a particular color and a particular frequency must form an independent set of G. Thus, any coloring and frequency assignment technique must use at least $$\left\lceil \frac{\left(\sum_{u \in N(vi)} r_u + r_{vi}\right)}{(3|F|)} \right\rceil$$

colors. Taking the maximum for all i, the desired result given by Equation (4) may be obtained.

In a further embodiment of the present invention, it can be shown that $$\lceil x \rceil \leq 3 \left\lceil \frac{x}{3} \right\rceil$$

for all non-negative real numbers x. Thus, Equations (1) and (4) can be rewritten as:

$$\max_i \left\lceil \frac{\sum_{u \in N(vi)} r_u + r_v}{|F|} \right\rceil \leq 3 \max_i \left\lceil \frac{\sum_{u \in N(vi)} r_u + r_{vi}}{3|F|} \right\rceil \quad (5)$$

Recall from Equation (1) that the number of colors used by the 4-approximation technique is at most $$\max_i \left\lceil \frac{\left(\sum_{u \in N(vi)} r_u + r_{vi}\right)}{|F|} \right\rceil \times \max_v r_v,$$

which is at most $$3 \max_i \left\lceil \frac{\left(\sum_{u \in N(vi)} r_u + r_{vi}\right)}{(3|F|)} \right\rceil + \max_v r_v.$$

In sum, it can be said that the 4-approximation technique of assigning slots provided by the present invention has analytical bounds, that being, in a worst case scenario the slot assignments provided by one iteration of the present invention (one cycle through the operation of decision unit 2 and generator 3) yields results which are no more than 4 times the number of slots of an ideal solution.

As described earlier, the problem of providing fairness is equivalent to assigning slots (colors) to access points in a superframe such that the total number of slots (colors) assigned to an access point v in a superframe is proportional to the number of stations $m_v$ associated with the access point. In addition, fairness is associated with the additional goal of maximizing the throughput of the system. In one embodiment of the present invention, slot sizes are assumed to be at least $\Delta$ time units. Let Đ denote the configured CFP in time units. Thus, the maximum number of slots in a CFP cannot exceed $R = \lfloor D \div \Delta \rfloor$. Thus, the problem of providing fairness can be formulated as a problem of finding the largest min-slots-to-users ratio $\rho$ such that there is a feasible superframe slot assignment in which access point $v \in V$ is assigned $r_v = \lceil \rho \cdot m_v \rceil$ slots. Note that a superframe slot assignment is feasible if there is a coloring and frequency assignment of the underlying graph $G = (V, E)$ in which node $v \in V$ has requirement $r_v$ and the total number of colors used is at most $R = \lfloor D \div \Delta \rfloor$. Those of ordinary skill in the art will recognize that the slot-assignment problem as stated above is very hard to solve optimally and even approximately. Recognizing this, the present invention "relaxed" the problem to develop efficient solution(s).

In yet an additional embodiment of the present invention, the problem was relaxed by realizing that no polynomial time constant approximation is possible for the slot-assignment problem unless P=NP.

One proof of this statement is as follows. For the sake of argument, assume a c-approximation technique X for some constant c for the slot-assignment problem. This implies that X outputs a $\rho > c\rho^*$ where $\rho^*$ is the optimal min-slots-to-users ratio. It can be shown that X can be used to decide whether a unit disk graph with all unit requirements and a single frequency can be colored with 3 colors. This is an NP-hard problem, implying that X does not exist unless P=NP. Given a unit disk graph $H = (V, E)$, an instance of the slot-assignment problem is created with G=H, $m_v$=1 for all v∈V, total number of slots (colors) R=3 and a single frequency. Note that if H is 3-colorable then for G the value of ρ=k≧1 for some k and if H is not 3-colorable then ρ=0. In the former case X outputs ρ≧kc while in the latter case X outputs ρ=0. Because 0<kc the return value of X can be used to determine if H is 3-colorable or not, thus, establishing that the slot-assignment problem is hard to approximate.

In light of the above, the present inventors turned to a different bi-criteria approximation for the slot-assignment problem. They defined an (α, β) approximation to be one that computes the value of ρ to within a factor α≦1 of the optimal min-slots-to-users ratio where the optimal is only allowed at most ⌊R/β⌋ slots. Note that the discussion above implied that a (c, 1)-approximation is not possible for any constant c. However, allowing an optimal solution to use a less, total number of slots is equivalent to restraining the optimal solution to use a bigger slot size since the size of a CFP is fixed at Ð time units.

In one embodiment of the present invention, a (1,3)-approximation technique X for the slot-assignment problem may be used when there is a single frequency. The X technique works by guessing (i.e., estimating) a value for the min-slots-to-users ratio ρ. For a particular guess of ρ, the technique sets $r_v$=⌈ρ·$m_v$⌉ for all v∈V. Next, a unit-disk graph coloring technique is used to color the underlying graph. Let f(ρ) denote the number of colors used for coloring this graph for the choice of ρ, where f(ρ) is a monotonically non-decreasing function of ρ. Technique X uses a binary search over ρ to compute the largest value ρ* for which f(ρ*)≦R and then outputs ρ=ρ*. Note that technique X need only consider those values of ρ for which $\max_v$⌈ρ·$m_v$⌉≦R.

The inventors also concluded that technique X is a (1, 3)-approximation technique for the slot-assignment problem when only one frequency is used and a (1,4) approximation when multiple frequencies are used. However, the proofs related to these conclusions are not necessary for an understanding of the present invention and have therefore been omitted.

The present inventors carried out simulations to compare the performance of the present invention with that of an existing WLAN.

In the simulations, the inventors used an 802.11 network with 50 APs, uniformly distributed over a grid of 1000×1000. Each AP had a transmission range of 100 units. This AP distribution was picked to ensure complete coverage of the grid. A layout approach was followed. It was assumed that 1000 mobile stations would always have pending messages to send. A message length of 1500 bytes (12000 bits) and a superframe size of 150 ms were used. Each simulation involved running a system according to the present invention for 1 minute and observing its behavior.

The inventors carried out simulations using both a single frequency and optimal frequency planning when there were 3 non-interfering frequencies, at different bit rates ranging from 1 to 10 Mbps per AP and for different CFP window sizes ranging from 10 ms to 140 ms. The results presented herein, unless noted otherwise, are for a system having an optimal frequency planning of 3 frequencies at a 10 Mbps bit-rate, and a CFP window size of 80 ms. That said, the results herein are typical for all of the simulations carried out by the inventors. Ideal network planning was used to illustrate the unfair behavior of existing Distributed Coordinated Function (DCF) and Point Coordinated Function (PCF) modes even in optimally planned networks.

Figure 3:
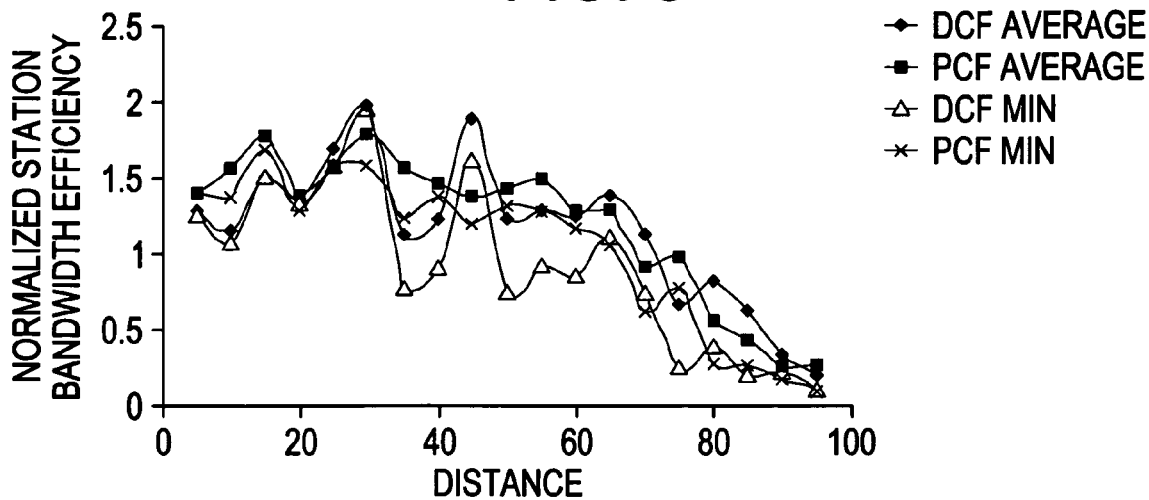
FIGS. 3-5 depict some simulations comparing results of the present invention against existing techniques.
Figure 4:
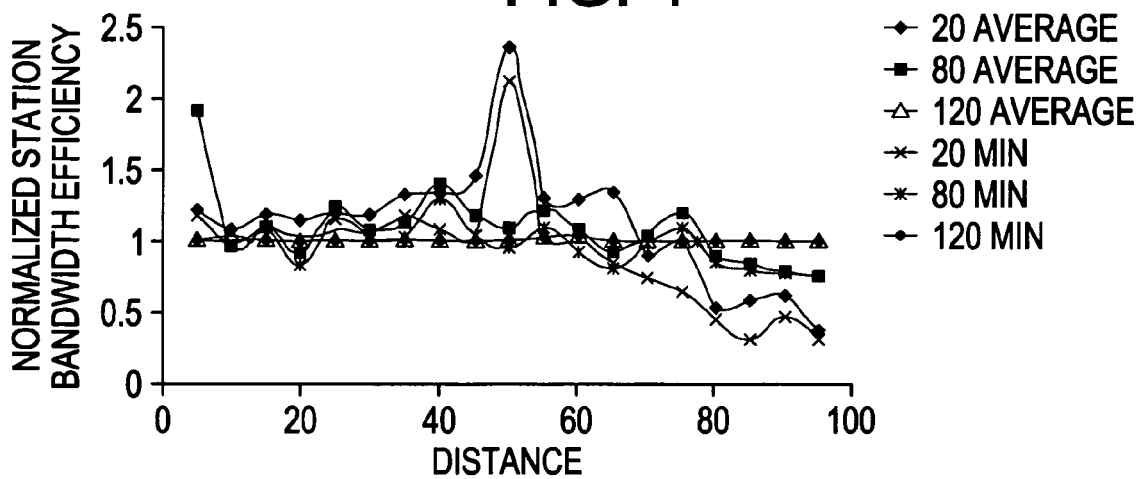

The first metric used to measure the relative performance of the present invention as compared to a known 802.11 based WLANs was intra-AP fairness. Here, the normalized efficient bandwidth of stations (e.g., mobile devices) was measured as a function of their distance from their associated APs. The normalized efficient bandwidth for a user/mobile device is computed by dividing the efficient bandwidth of the user by the average efficient bandwidth of all users associated with an AP. Both the average and the minimum values for the normalized efficient bandwidth were measured for both PCF and DCF modes, and then compared to that of the present invention. Note that an ideal (fair) system should have both an average and minimum normalized station efficient bandwidth of 1 at all distances from an associated AP. FIG. 3 shows results associated with a known 802.11 system in PCF and DCF modes for both the average and minimum normalized network efficiency of stations within the transmission range of the AP, while FIG. 4 shows results associated with the present invention using the same parameters for three different CFP window sizes: 20 ms, 80 ms and 120 ms. These results show that in 802.11 systems the normalized efficient bandwidth of stations far away from an AP is close to 0, both for the average and minimum metrics. On the other hand, systems operating in accordance with the present invention have average and minimum normalized station efficient bandwidths close to 1 at all distances even for a CFP window of 80 ms. The behavior of systems operating in accordance with the present invention is very close to that of an ideal system even when a CFP window size is 120 ms.

Figure 5:
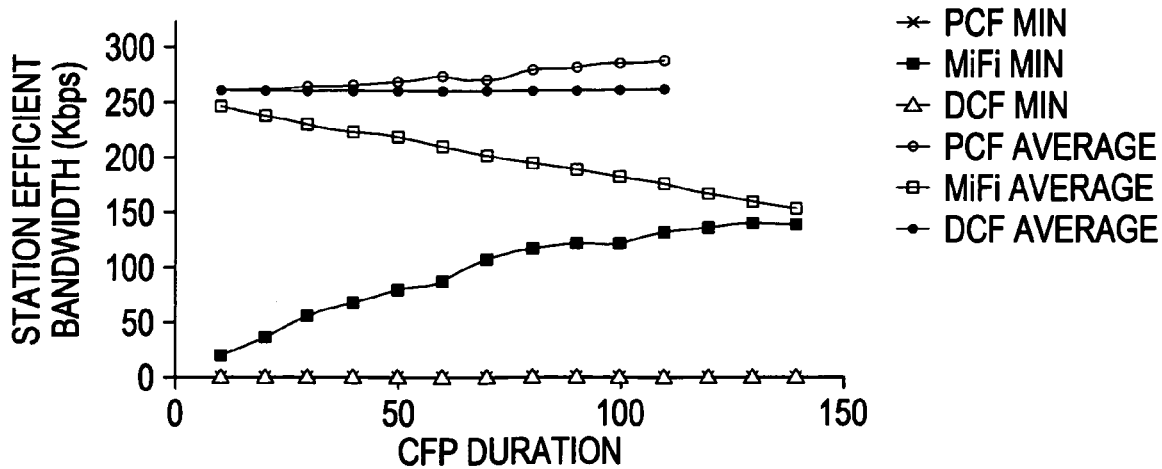

The second metric used was inter-AP fairness. Here the minimum and average efficient bandwidths of all stations in a system are measured as a function of the CFP window size. The results presented in FIG. 5 are for a rate of 10 Mbps and indicate that the minimum value is almost 0, indicating starvation, in both PCF and DCF modes for all CFP window sizes in existing systems. In contrast, in the present invention as the CFP window size is increased, the minimum value rapidly approaches the average efficient bandwidth of all stations. Even for small CFP window sizes the gap between the minimum and the average is not significant. These results show that the present invention is starvation free and provides excellent fairness.

The third metric used was the overall system throughput (i.e., the average efficient bandwidth of all stations times the number of stations). Multiplying the results for the average efficient bandwidth in FIG. 5 by 1000 gives the system throughput, as a function of the CFP window size. The results showed that even for large CFP window sizes, the overall system throughput of a system operating according to the present invention is comparable to that of existing 802.11 networks. Moreover, it was noticed that there is an optimal CFP size of 130 ms for the present invention, at which the minimal efficient bandwidth of any station is maximized.

Having presented a discussion of some examples of the present invention, it should be noted that modifications may be made to those examples. Such modifications may still be within the spirit and scope of the present invention as defined by the claims which follow.

We claim:

1. A method for coordinating transmissions of access points in a wireless local area network comprising the steps of:
   estimating a number of slots for each access point associated with a contention free period (CFP);
   generating estimated slot sequences, slot assignments and a transmission frequency for each access point based on the estimated number of slots and an interference graph associated with every access point;

determining a total number of slots used in the estimated slot assignments;

comparing the total number of slots to an available number of slots;

adjusting a slot-to-user ratio of each access point until said ratios substantially equal a maximum, lower bound of all of the slot-to-user ratios; and assigning each access point a number of slots and a slot sequence based on the estimated slot assignments and slot sequences and assigning each access point a transmission frequency when the total number of slots equals the available number of slots.

2. The method as in claim 1 wherein the adjustment step further comprises the steps of:

increasing the slot-to-user ratio of each access point when the total number of slots is less than the available number of slots; and decreasing the slot-to-user ratio of each access point when the total number of slots is greater than the available number of slots.

3. The method as in claim 1 further comprising the steps of:

estimating a next number of slots for each access point based on each access point's adjusted slot-to-user ratio; and generating next, estimated slot sequences, slot assignments and a transmission frequency for each access point based on the next number of slots and the interference graph.

4. The method as in claim 1 wherein the generation step further comprises generating the estimated slot sequences, slot assignments and frequencies such that no two interfering access points are assigned the same transmission frequency during a given slot and such that a total number of assigned slots is minimized.

5. The method as in claim 1 wherein the method comprises a 4-approximation technique.

6. A system for coordinating transmissions of access points in a wireless local area network operable to:

estimate a number of slots for each access point associated with a contention-free period (CFP);

generate estimated slot sequences, slot assignments and a transmission frequency for each access point based on the estimated number of slots and an interference graph associated with every access point;

determine a total number of slots used in the estimated slot assignments;

compare the total number of slots to an available number of slots;

adjust a slot-to-user ratio of each access point until said ratios substantially equal a maximum, lower bound of all of the slot-to-user ratios; and assign each access point a number of slots and a slot sequence based on the estimated slot assignments and slot sequences and assigning each access point a transmission frequency when the total number of slots equals the available number of slots.

7. The system as in claim 6 further operable to:

increase the slot-to-user ratio of each access point when the total number of slots is less than the available number of slots; and decrease the slot-to-user ratio of each access point when the total number of slots is greater than the available number of slots.

8. The system as in claim 6 further operable to:

estimate a next number of slots for each access point based on each access point's adjusted slot-to-user ratio; and generate next, estimated slot sequences, slot assignments and a transmission frequency for each access point based on the next number of slots and the interference graph.

9. The system as in claim 6 further operable to:

generate the estimated slot sequences, slot assignments and frequencies such that no two interfering access points are assigned the same transmission frequency during a given slot and such that a total number of assigned slots is minimized.

10. The system as in claim 6 wherein the system is operable to coordinate the transmissions using a 4-approximation technique.

11. A system for coordinating transmissions of access points in a wireless local area network comprising:

means for estimating a number of slots for each access point associated with a contention free period (CFP);

means for generating estimated slot sequences, slot assignments and a transmission frequency for each access point based on the estimated number of slots and an interference graph associated with every access point;

means for determining a total number of slots used in the estimated slot assignments;

means for comparing the total number of slots to an available number of slots;

means for adjusting a slot-to-user ratio of each access point until said ratios substantially equal a maximum, lower bound of all of the slot-to-user ratios; and means for assigning each access point a number of slots and a slot sequence based on the estimated slot assignments and slot sequences and assigning each access point a transmission frequency when the total number of slots equals the available number of slots.

12. The system as in claim 11 further comprising:

means for increasing the slot-to-user ratio of each access point when the total number of slots is less than the available number of slots; and means for decreasing the slot-to-user ratio of each access point when the total number of slots is greater than the available number of slots.

13. The system as in claim 11 further comprising:

means for estimating a next number of slots for each access point based on each access point's adjusted slot-to-user ratio; and means for generating next, estimated slot sequences, slot assignments and a transmission frequency for each access point based on the next number of slots and the interference graph.

14. The system as in claim 11 further comprising:

means for generating the estimated slot sequences, slot assignments and frequencies such that no two interfering access points are assigned the same transmission frequency during a given slot and such that a total number of assigned slots is minimized.

* * * * *